United States Patent
Venezia (10) Patent No.: US 11,956,363 B2
(45) Date of Patent: Apr. 9, 2024

(54) SYSTEMS AND METHODS FOR HIERARCHICAL ORGANIZATION OF DATA WITHIN A NON-FUNGIBLE TOKENS OR CHAIN-BASED DECENTRALIZED SYSTEMS

(71) Applicant: Nicholas M. Venezia, San Antonio, TX (US)

(72) Inventor: Nicholas M. Venezia, San Antonio, TX (US)

(*) Notice: Subject to any disclaimer, the term of this patent is extended or adjusted under 35 U.S.C. 154(b) by 0 days.

(21) Appl. No.: 18/052,859

(22) Filed: Nov. 4, 2022

(65) Prior Publication Data

US 2023/0143854 A1    May 11, 2023

Related U.S. Application Data

(60) Provisional application No. 63/292,338, filed on Dec. 21, 2021, provisional application No. 63/289,959, filed on Dec. 15, 2021, provisional application No. 63/289,991, filed on Dec. 15, 2021, provisional application No. 63/289,274, filed on Dec. 14, 2021, provisional application No. 63/263,658, filed on Nov. 5, 2021.

(51) Int. Cl.
*H04L 9/32* (2006.01)
*G06F 21/62* (2013.01)

(52) U.S. Cl.
CPC ............ *H04L 9/3213* (2013.01); *G06F 21/62* (2013.01); *H04L 2209/60* (2013.01)

(58) Field of Classification Search
CPC .................. G06Q 20/00–425; H04L 9/00–50
See application file for complete search history.

(56) References Cited

U.S. PATENT DOCUMENTS

| | | | |
|---|---|---|---|
| 5,892,900 A * | 4/1999 | Ginter | G06F 21/78 726/26 |
| 10,540,654 B1 * | 1/2020 | James | G06Q 20/223 |
| 2012/0209707 A1 | 8/2012 | Ramer | |
| 2013/0144723 A1 | 6/2013 | Green | |
| 2013/0291123 A1 | 10/2013 | Rajkumar | |
| 2015/0154646 A1 * | 6/2015 | Mishra | G16H 50/30 705/3 |
| 2018/0165688 A1 | 6/2018 | Ismail | |

(Continued)

FOREIGN PATENT DOCUMENTS

WO    WO-2022182674 A1 *   9/2022   ............ G06F 40/211

OTHER PUBLICATIONS

Emerging-tech_glossary-crypto (Year: 2018).*

(Continued)

*Primary Examiner* — Ari Shahabi
(74) *Attorney, Agent, or Firm* — Sheppard Mullin Richter & Hampton LLP (57) ABSTRACT

Systems and methods for controlling access to resources. The methods comprise a data structure (e.g., a blockchain, etc.) using a parent NFT or child NFTs to control access to resources and recording data in a block indicating performance of a transaction or activity in relation to the resources. At least one block comprises the parent NFT with the child NFTs nested therein. The parent NFT may comprise a first smart contract defining a main policy for accessing or using the resources. The child NFT may comprise a second smart contract defining a sub-policy for accessing or using the resources.

12 Claims, 7 Drawing Sheets

(56) References Cited

U.S. PATENT DOCUMENTS

| | | |
|---|---|---|
| 2019/0005595 A1 | 1/2019 | Tautenhan |
| 2019/0279204 A1* | 9/2019 | Norton ............... G06Q 20/3827 |
| 2019/0294817 A1* | 9/2019 | Hennebert ............ H04L 9/0861 |
| 2019/0332807 A1* | 10/2019 | LaFever .............. G06F 21/6254 |
| 2020/0005284 A1 | 1/2020 | Madhu |
| 2020/0051043 A1* | 2/2020 | Wilson ............... G06Q 20/3678 |
| 2020/0311299 A1 | 10/2020 | Amar |
| 2020/0349249 A1 | 11/2020 | Weston |
| 2021/0243027 A1 | 8/2021 | Gupta |
| 2022/0101316 A1* | 3/2022 | Cramer .............. G06Q 20/3825 |
| 2022/0188925 A1* | 6/2022 | Blaikie, III ........ G06Q 30/0206 |
| 2022/0245744 A1 | 8/2022 | Alagappan |
| 2022/0271915 A1* | 8/2022 | Turner ................. H04L 9/3247 |
| 2022/0391895 A1* | 12/2022 | Weber ............... G06Q 20/3823 |
| 2023/0038714 A1* | 2/2023 | Padmanabhan ........... H04L 9/30 |
| 2023/0040773 A1* | 2/2023 | Dalton ................ G06Q 20/389 |
| 2023/0068229 A1* | 3/2023 | Blania .............. G06Q 20/40145 |

OTHER PUBLICATIONS

Merkle Tree in Blockchain: What is it, How does it work and Benefits (Year: 2023).*
Youtube https://www.youtube.com/watch?v=PraPZFMj6h8&t=8s (Year: 2023).*
Rakesh Sharma, Non-Fungible Token (NFT): What ItMeans and How It Works, Updated Jan. 28, 2023 (Year: 2023).*

* cited by examiner

SYSTEMS AND METHODS FOR HIERARCHICAL ORGANIZATION OF DATA WITHIN A NON-FUNGIBLE TOKENS OR CHAIN-BASED DECENTRALIZED SYSTEMS

CROSS REFERENCE TO RELATED APPLICATIONS

The present application claims priority to U.S. Provisional Patent Application Ser. No. 63/263,658 which was filed on Nov. 5, 2021, U.S. Provisional Patent Application Ser. No. 63/289,274 which was filed on Dec. 14, 2021, U.S. Provisional Patent Application Ser. No. 63/289,959 which was filed on Dec. 15, 2021, U.S. Provisional Patent Application Ser. No. 63/292,338 which was filed on Dec. 21, 2021, and U.S. Provisional Patent Application Ser. No. 63/289,991 which was filed on Dec. 15, 2021. The listed applications are incorporated herein in their entirety for all purposes.

DESCRIPTION OF THE RELATED ART

A blockchain is a digital ledger for recording transaction information in a way that is difficult to change. Blockchains are often used to record and track an exchange of information or other transaction (e.g., relating to assets in a business network). The digital ledger comprises a plurality of blocks that linked together using cryptography. Each block contains a cryptographic hash of the previous block, a timestamp, and transaction data.

SUMMARY

In some examples described herein, systems and methods are provided for controlling access to resources. For example, a method comprises generating, by a computing device (e.g., a server), a chain or other data structure for storing the permissions for accessing such resources, including a parent NFT with one or more child NFTs nested therein. In some examples, the data structure comprises a plurality of blocks linked to each other. The parent NFT comprises a first smart contract defining a main policy for accessing or using resources. The main policy may define privacy settings for the resources. The child NFT comprises a second smart contract defining a sub-policy for accessing or using the resources. The chain may be stored in a distributed storage system. Other storage structures can include quantum storage structures, a decentralized compute (e.g., for Web3), a distributed shared processing, storage, and authentication systems, and other blockchain networks. When quantum storage structures are implemented, the data may be stored as strings or Qubits (e.g., as a two-state quantum-mechanical systems that exist in the two states simultaneously, or a matrix of Qubits). In these examples, the smart contract can store the matrix filled with various data elements.

In some examples, the computing device uses the parent NFT or the child NFTs to control access to the resources by another computing device (e.g., a client computing device). Data may be recorded in a second block indicating performance of a transaction or activity in relation to the resources. The parent NFT or child NFTs may be modified at any time (e.g., subsequent to the recording operations).

In some scenarios, first and second child NFTs may be nested in the parent NFT. The first child NFT may be associated with a first individual or group of individuals. The second child NFT may be associated with a second individual or group of individuals. The chain may comprise (i) a first chain branch comprising first leaf blocks recording transactions or activities performed by the first individual or group of individuals in relation to the resources and (ii) a second chain branch comprising second leaf blocks recording transactions or activities performed by the second individual or group of individuals in relation to the resources.

In those or other scenarios, at least one child NFT may be associated with a group of individuals and has sub-child NFTs nested therein. Each sub-child NFT may be associated with a respective individual of the group of individuals. The chain comprises a set of chain branches, each being associated with a respective one of the sub-child NFTs. A first chain branch of the set comprises first leaf blocks recording transactions or activities performed by a first individual of the group of individuals in relation to the resources. A second chain branch of the set comprises second leaf blocks recording transactions or activities performed by a second individual of the group of individuals in relation to the resources.

In some examples, a method for maintaining NFT relationships can comprise reviewing one or more user preferences associated with a parent NFT. The system can determine that a child NFT of a plurality of child NFTs has permission to access information on the parent NFT based on the one or more user preferences. Each child NFT of the plurality of child NFTs can be associated with a third party. The system can grant the child NFT limited access to information on the parent NFT based on the one or more user preferences. Through the child NFT, the system can receive a resource from the child NFT for the parent NFT. This resource can be based on the information on the parent NFT and the one or more user preferences. The system can then transmit the resource to a user device associated with the parent NFT. The resource may be stored on the user device. Alternatively, the user device may receive instructions on accessing the resource, such as through a QR code.

When quantum computing is implemented, the system may be dynamic and operate within a data matrix. Each block may correspond with computer-implemented rules to instruct the operation of components of the system. For example, each box in the data matrix may correspond with a child policy. The plurality of child policies may be governed by rules incorporated with the parent smart contracts. In this example, the smart contract may govern the rules across various matrixes. The parent smart contract can cover children which can correspond with the child quadrant of the data matrix.

The implementing systems can comprise: a processor; and a non-transitory computer-readable storage medium comprising programming instructions that are configured to cause the processor to implement a method for controlling access to resources. The above described methods can also be implemented by a computer program product comprising a memory and programming instructions that are configured to cause a processor to perform operations.

BRIEF DESCRIPTION OF THE DRAWINGS

The present solution will be described with reference to the following figures, in which like numerals represent like items throughout the figures.

DETAILED DESCRIPTION

Embodiments of the systems and methods described herein involve encoding data on any data structure, including a block-chain, smart chain, or other such chain-based, distributed, and decentralized ledger in the form of a singular NFT. NFTs that are stored in the data structure are freely transferable, with proof-of-ownership provided by the decentralized, distributed, and independently verifiable nature of a block-chain ledger. In general, NFTs are comprised of specific data, including, but not limited to, digital images or video content, digital sound and musical content, written works, computer code, or sets of data of any kind not necessarily tied to an image or tangible work. A smart contract may be created on a distributed, decentralized ledger, that verifies ownership, and facilitates transferability of the NFT. In some scenarios, ownership of the NFTs and the identity of individuals listed in the NFTs can be verified using methods described in U.S. Patent Provisional Application No. 63/194,504 which is entitled "Methods and Systems for Presenting Advertisements on User Data" and filed on May 28, 2021. The entire content of this application is incorporated herein by reference.

In some examples, the data may be stored off of the chain described herein. alternative data storage may include on-chain or off-chain data, online, offline, printed material, computer readable media (CRM), Data Management Platform, Consent Management Platform, or other storage or grants of rights.

In some examples, a smart contract may be replaced with other forms of computational verification without diverting from the essence of the disclosure. For example, either user may initiate an acceptance of a privacy policy, download and install a certificate on device or computer, accept terms of service, or accept an offline contract.

In one embodiment, data within a single NFT can be arranged within a hierarchical structure such as, but not necessarily, a filing system, database, catalog, or any other system of hierarchical organization containing multiple divisions and subdivisions. NFTs can be created from multiple sets of data and can be arranged, indexed, and accessible by a smart contract in any configuration dictated by the smart contract. An NFT may operate at a parent level, presenting a singular container that may, but not necessarily, be tied to an entity, whether an individual, group, organization, or other distinct entity whether real or fictional, and to which multiple distinct and interloping data sets may be added in an indexed, hierarchical manner. Such an NFT may then act as a smart token to provide authentication for the entity, and all of the data stored under this parent NFT. By arranging such data sets under a single, token-based identifier, a system of smart contracts may be provided that controls the manner in which all data associated with the parent NFT may be accessed, utilized, leased, sold, or transferred, or undergo any such operation as may be laid out in the smart contracts at the time of creation.

Embodiments can create a token-based identity whereby any data associated with that identity may be aggregated, organized, accessed, verified, and utilized for any purpose including, but not limited to, identity authentication, verification of ownership or access, verification of assets such as currency, smart tokens or NFTs, aggregate data of any kind associated with the identity, identity passport verification wherein identity maybe verified without providing access to the entirety of the present data, verification of token-based access rights such as event ticketing or exclusive access, or any other data that may be associated with the parent NFT.

In one illustrative embodiment, a user may bring a mobile device in the range of kiosk at a mall or advertising location using Bluetooth or RFID capabilities. The kiosk may sense the mobile device and automatically access a parent NFT. This parent NFT may represent the user's preferences and data. Preferences can include privacy considerations, preferred advertisements, tokens to allow third party access to the NFT data, or other representations of the user's identity. The parent NFT may communicate with the kiosk to determine what businesses have access to the parent NFT given the user's preferences and privacy settings. The appropriate businesses may transmit a child NFT which can contain rewards, advertisements, or offers tailored for the user's experience at the location. In this way, the user would only receive desired advertisements with immediate relevancy to the user's visit to the location. Any rewards or offers may be readily available to the user such that the user can use a representation of the parent NFT (e.g. a QR code or barcode) to use rewards at the appropriate location. Kiosks may be specific to the industry or business. For example, a kiosk may present at a hospital to automatically access a user's medical history and other appropriate data. The user can update the parent NFT to provide the hospital access to specific data, such as family history for a specific medical condition, reasons for the hospital visit, etc.

Multiple types of data can be associated with the parent NFT, such as behavioral attributes, consumer taste preferences, transactional data, geo-location data and data generated by a user. A website or app on a user device can reference the consumers preferences for data collection on websites to determine if consent needs to be received or has already been given previously. If the preferences deny access to the website, the user device can send and enforce a "do not track" request meaning that data will not be transferred. The consumer would avoid any text spam or additions to unwanted list serves that result in telemarketer calls. The consumer can grant consent which can be enforced via a telecom carrier, ISP, ad exchange, demand side platform, other smart devices, and or machine learning via user data. All grants of access or usage by third parties can either be publicly or privately stored based on a user consent policy as dictated by the parent NFT. Using privacy considerations such as a Global Privacy Platform (GPP), the system can reference if a data broker, brand, advertiser, artificial intelligence (AI), publisher, or creator has received the required user consent for usage. Other considerations can include transparency obligations as required under the Digital Services Act. The system can reference if the third party's website or platform has valid terms of use, transparency reporting, and advertising transparency to determine if consent is valid. If the consent has already been revoked or denied, the usage of data or display of an ad will be declined.

The embodiments described herein can be used to manage one or more users' telecommunications. As described above, the system can block telemarketer calls based on the relationship graph of hierarchy of NFTs. As an example, the parent NFT can update a blocked callers list on the associate user device. The parent NFT can be linked to the user's mobile number and contacts and can update a trust network with the phone number. This trust network can comprise saved contacts, social media connections, or other connections that the user indicates are valid. The parent NFT can trigger analysis whenever calls come in to the user's mobile device. Based on this trust network, the parent NFT can immediately block the inbound caller if it is not a part of this trust network (i.e. not in the user's contacts, social media friends, etc.). To avoid missing calls associated with the user's required payments, specific companies can be added to the trust network based on the accounts and payments associated with the parent NFT. As an example, if the parent NFT is associated with a particular mobile number, the respective phone company could be automatically added to the trust network to facilitate any maintenance calls or payment calls that are transmitted, even if the calls are automated calls. As another example, if the parent NFT is associated with a particular media subscription, the media company can be added to the trust network as the parent NFT has information that this media company has a relationship with the user associated with the parent NFT.

On the other hand, if a user has granted interests and taste preferences for a particular media distributor, content may dynamically transmit to the user, preserving product placement and new forms of media that matches the user's interests. Using the dynamic media, users can receive tailored rewards or other items of value to that user (e.g. exclusive character skins in a video game). The parent NFT may also fluctuate certain values in accordance with a user's consumption rate, usage, or expiration of resources. As an example, if an item is purchased in a video game that has a 24 hour life span, the parent NFT may maintain information on how much time is left to use the item. The user may retrieve the item at any point and sell the remaining portion of the partially consumed NFT. This can be accomplished by new smart contracts that can be created in real-time during gameplay that update the remaining lifespan of the item.

In one illustrative embodiment, a user may create an NFT on any chain-based, decentralized, distributed ledger, utilizing multiple data sets arranged within a smart contract in a hierarchical structure. Such a smart contract may include an index of all data contained within the NFT, arranged in divisions and subdivisions in any manner that may be desirable. The NFT may be associated with an identity, real or fictional, individual or of a group or organization and be utilized as a parent-level identity under which multiple sets of data may be arranged, and added to in any manner described by the smart contract comprising the NFT. The parent NFT may act as a token-based identity, comprising all relevant data associated with that identity. Such data may be arranged hierarchically beneath an identity layer that provides authentication of identity without necessarily providing access to the entirety of the associated data. This arrangement functions as a token-based passport, providing proof of identity without compromising the underlying data. The parent NFT may contain as a subdivision of data, a chain-based wallet for any currency, smart tokens, or other NFTs.

Notably, the chain architecture described above implements a hierarchical structure. The hierarchical data structure allows multiple sets of data to be nested within a single NFT (e.g., the parent NFT) and organized into divisions and subdivisions with the NFT in accordance with any desirable arrangement. A creator of the NFT may encode any data set or collection of data sets in any arrangement therein. The system may then verify the data at any level of the hierarchy, whether top-level organizational data, intermediary-level data or bottom-level data. The chains of the present solution may be used in network systems for controlling client device access to or use of resources. A server may validate a client device's authorization to access or use a given resource. This validation can be based on the NFTs and policies defined in the smart contracts thereof. Any transactions or activities relating to the accessed resources can be recorded in the digital ledger.

The ledger can be verified. For example, by implementing the ledger in a distributed and decentralized blockchain, changes to the data on the blockchain may be independently confirmed at each node, which can reduce the chance for fraud at a single node. In some examples, multiple distributed entities may initiate a computational form of ledger verification without a blockchain data structure. Rather, the system may take arbitrary data, transform and distribute it to the network of nodes. The nodes can store or run computations on the data and return the results to the system for reconstruction, which can be implemented in inter-node messaging using a verifiable secrete sharing to correct reconstruction of the data.

Usage of the data contained within the NFT, in any capacity, may be associated with specific fees or exchanges of assets that are stipulated by smart contracts within the parent NFT. Any fees generated by such usage may be automatically routed to the digital wallet contained as a subdivision of the parent NFT. Data regarding use of the parent NFT, in any part, may be automatically gathered and indexed via smart contract under the parent NFT in a manner stipulated in the smart contract of the parent NFT. In this manner, data regarding the usage, in any capacity, of the parent NFT may be automatically added under the parent NFT as a subset of data and may be interacted with in any way set forth by the smart contract governing the collecting and addition of such data. Access to the data may be opt-in/opt-out by a human user associated with the parent NFT.

The parent NFT may contain as a subdivision of data, token-based proof of access such as a digital ticket providing exclusive access events, spaces, or services in the real world or to any digital space or service. Any such token added to the NFT may unlock at the time of use, such as, but not necessarily, scanning a token-based ticket to enter an event. The use of such a token would then become data regarding the activity of the parent NFT and be stored as activity data automatically via smart contract. The parent NFT may contain as a subdivision of data, any activity data associated with the identity represented by the parent NFT, such as, but not limited to, social media activity, location data in the real world, engagement data such as views, subscriptions, likes, and comments associated with any content or media, or any other activity data whether online or offline.

In one illustrative example, a system can allow for the creation, exchange, and execution of smart contracts relating to financial assets and investment vehicles in a decentralized market and exchange. For example, the system can comprise a decentralized, verifiable ledger of transactions, a platform for the creation of self executing protocols or smart contracts, and an electronic financial exchange allowing for the marketing and exchange of the smart contracts, all utilizing an open, permissionless, and trustless "web 3.0" architecture. Such architecture provides a secure and verifiable network whereby the user may create, exchange, and execute smart contracts pertaining to derivatives, financial instruments, or any other investment vehicle, or any underlying asset, tangible or intangible, that may be identified by a numeric signifier.

The system may provide a decentralized and distributed, verifiable ledger recording all exchanges to provide proof of stake when executing any smart contract stored with the system. The ledger can utilize block-chain encryption allowing the system to verify transactions, ownership, stake, and payment in order to properly execute the smart contracts generated in the system and provide security and stability to the exchange. Smart contracts generated by the user may be stored in the data store (e.g., a distributed block chain, etc.) and made available for exchange with other users of the system under the terms generated by the user upon creation of the smart contract. The system may be configured to provide an index of smart contracts available for exchange and allow for peer-to-peer exchange of all contracts representing various assets on the network. The system may be configured to track the exchange of such contracts via the ledger and provide for the self-execution of smart contracts, in an open, trustless, and permissionless exchange. The identity and an individual user may be verified on the ledger. The user sends a unique action, such as, but not necessarily, biometric data, or other unique identifier which may be used to generate a code in a secondary form that may be used to verify the identity of the user. In some examples, the parent NFT may act as an authentication token of the user who, by having access to the parent NFT and ability to transmit the parent NFT, may help verify the identity of the user by a receiving device or system.

The system can be utilized by a user to generate smart contracts utilizing protocols for peer-to-contract interaction. Such contracts can provide fractional ownership of the contract contingent upon each individual investor's contribution to the contract per the terms set by the contract at the time of generation. Such contracts may be held until the execution of the contract or may allow the individual investor to enter and exit the contract freely. Such contracts may be utilized for providing investment vehicles including, but not limited to fractional lending pools, mutual funds, and fractional ownership of any asset represented by the contract, contingent upon the terms accepted by the user at the time they entered into the contract. The user may: generate a smart contract for financial exchange of fungible assets, including, currency, crypto-currency, or any fungible token available for exchange, including, but not limited to, de-fi platform investment tokens; generate a smart contract for financial exchange of any investment vehicle, including, but not limited to, options, swaps, futures or other derivatives upon such fungible assets; generate a non-fungible token to be stored on the ledger and may make available for exchange such a token; generate a non-fungible token representing a unique collection of data points (for example, such a token may then operate as an intangible, transferable asset representing the specific data used in its creation); use their identity in any form they wish to generate a non-fungible token that may be made available for exchange with other users of the system (for example, such a non-fungible token would be generated based on identifying information and may, but not necessarily, be valued based on social media or online influence); generate and make available for exchange, smart contracts representing any investment vehicle, including, but not limited to, options, futures, swaps or other derivatives built upon such non-fungible tokes; or generate a smart contract representing a blended, underlying asset, including, but not limited to debt securities, which may then be made available for exchange with other users of the system. The generation, exchange, and execution of such contracts may happen in the real world as stipulated in the smart contract at the time of its creation. Such contracts may, but not necessarily, be stored and verified on the ledger for security purposes while being executed and exchanged in the real world.

The user may alternatively or additionally: generate and make available for exchange, a smart contract associated with a parent NFT, which represents any intangible, transferable, digital good of any perceived value; or generate and make available for exchange, smart contracts representing derivatives, including, but not limited to, options, futures, swaps, or any other investment vehicle based on such transferable digital goods. An allowance may be provided whereby a user who is blind or severely disabled may employ the service of a representative to interact with the system on their behalf in any and all capacities. The system will allow the user to designate the unique identifier of the representative to be linked to the user's identifier as a representative in such capacities as are designated by the user.

In one illustrative example, the system can provide an efficient, secure, and automated solution by which brands, trademark owners, and other users may utilize smart contracts to create, market, and exchange any tangible or intangible item. In one illustrative embodiment, users may interact in an open, trustless, and permissionless marketplace which utilizes the parent NFT comprising a smart contract to allow users to make available for exchange any item, tangible or intangible, which may be digitally represented (e.g., trademarks, branding, artworks, etc.). Such a system can provide a platform for users to create smart contracts and self-executing transaction protocols in the form of computerized code, that would provide a transaction agreement for any tangible or intangible item that may be digitally represented including, but not limited to trademarks, branded materials, or other materials, available for license. Smart contracts could then be made available for license, lend, lease, trade, purchase, or transfer or any other transaction the creator of the contract may wish to enact. The present solution may provide guaranteed verification of ownership, transaction, and payment via smart contract on any block-chain.

In one illustrative example, the system can generate a parent NFT for a user to access an event, space, performance, etc. The parent NFT may correspond with an electronic code, such as a bar code or QR code, that acts as confirmation of the access that has been granted. The QR code can be shown to a scanner located at the event space to verify identification of the user and can act as proof of permission to access the event. Such an NFT may be freely transferable and the current owner of that NFT may be independently verifiable via the data store or immutable blockchain.

In one illustrative example, the system can provide for storage, access, and usage of electronic medical records, or any other private, personal information whereby the individual retains control and ownership of the information. The user of the parent NFT can permit access to certain medical records and restrict access to other medical records. The permissions may be stored in the smart contract associated with the parent NFT. The user may provide or revoke access to such information to other entities and individuals including, but not limited to, doctors, medical service providers, advertisers or any other interested party. The system can be used to collect and encode an individual's medical records, or any other private, personal information, on a private smart chain and creating the parent NFT that provides a link to the data can also confirm the identity of the user and permission levels of the specified data. Data can also be linked to accessibility requirements, such as those required under the American Disabilities Act (ADA). The parent NFT may collect information on meeting ADA requirements such as closed captioning, sight accessibility, or information on other accessibility needs. The parent NFT may be able to communicate to the child NFT that certain accessibility needs are not being met. The parent NFT and permissions may be stored in a data store or, sometimes, on a distributed, verifiable block chain or smart chain, representative of that data set and pointing to that information on the private smart chain. The parent NFT may be representative of the individual's private data may be referenced in a smart contract, whereby the individual retains control and ownership of the NFT and the data it represents, while also provide or revoke access to the information via said smart contract. The smart contract controlling access to the NFT representative of the user's personal data may provide, revoke, or lease access to the information to other entities and individuals including, but not limited to, doctors, medical service providers, advertisers, or any other interested party, as dictated by the terms of the smart contract laid out at the time of creation.

In one illustrative example, the system can encode a social media presence of an individual, group, organization, or any other discreet entity, including, but not limited to, the social media accounts, posts, followers, likes, comments, and engagement associated with that entity's social media presence, in the form of the parent NFT. In the artist-based applications, the smart contract associated with the parent NFT can be used to define and control who has access to the artist's work or how royalties are to be distributed amongst certain individuals. The artist or owner of a smart contract can change, update, compare, delete, edit, restore to a historical state, or view historical access or changes. The associated NFT might be engaging with multiple external communities or other rules and obligations that might be set by the platform. For example, a music streaming platform could have an overarching user NFT or smart contract that designated how the user wants the information they captured on.

A reference for Web 2.0 can occur when a user accepts a smart contract. This may comprise multiple acceptances that can or cannot be stored in a data structure (e.g., on-chain, off-chain, intranet, internet, or dispersed amongst computing devices). This allows a record to be generated of visits to a location within Web 2.0 and policy acceptances of each device. When a policy is approved, declined, or cancelled, the system records that a visit took place and generates permissions for how information is to be handled. A user can append or update, add to, request, encrypt, grant or revoke actions based on subsequent actions of how data is handled. For example, a user could specify whether she would be compensated for data, whether she like the artist to know she listened to the music, whether she would like to receive advertisements, or would like to have information presented subsequent to having listened to a song by the given artist. The user may see subsequent advertisers or promotional activity or analytic features or measure mental or other action taken because of previous actions.

The systems described herein focus on a hierarchy of actions (e.g., child, sibling, parent) that can executed, stopped, or started in response to a preceding action. The smart contract associated with the parent NFT can also be held at the user level for easy updates in the data structure (e.g., in the blockchain) or other layer where third parties can view and edit the smart contract. The system can employ a secondary NFT or token assigned to a person, smart contract, or group. Payment can also be executed in real-time to all parties as information may be simultaneously updated. For example, music platforms like Spotify® may require up to sixty days to pay a record company and the music artist (e.g., a user of the system) may have a parent NFT. The record company may have a child NFT. The parent NFT may store the obligation to pay the record company in the smart contract, since the child NFT associated with the record company may be nested with the storage of the parent NFT. By tracking the child NFTs that have payment obligations by the user of the parent NFT, the system can automate payment and can reduce the payment time.

Payments can also be automated using machine learning algorithms that can execute payments on behalf of a parent NFT. For example, an algorithm may determine that a parent NFT is associated with a particular subscription that requires periodic payments. The algorithm can set those payments automatically or automatically transfer certain resources and/or instructions to a user when payments are do. In another illustrative example, a parent NFT may be associated with a mortgage payment, with the mortgage company being associated with a child NFT. When a mortgage payment is due, the parent NFT can track the time the payment is due and initiate the payment to the child NFT at a certain time. In this example, no physical interaction may be involved, or the payment initiation may be triggered at a particular time after the parent NFT and child NFT are related (e.g., as defined in the smart contract).

Machine learning algorithms may also automate the consumption of data. For example, if a parent NFT is associated with a user's medical data, the parent NFT may automatically update as medical data updates. If a user measures glucose levels as part of diabetes management, the parent NFT may update in real time with each measurement to record how much insulin is required based on the most recent glucose level. In another illustrative example, a parent NFT may be associated with a human parent, with a child NFT associated with a minor's mobile device or other devices. The parent NFT can update to receive actions of the child NFT based on where the child NFT is transmitted. In this example, if the minor visits a shopping mall and a kiosk senses the child NFT, the parent NFT can be updated to notify the parent of the minor's location and/or purchases. Alternatively, a parent NFT can be created when a human child is born, such that the parent NFT can track actions in the child's life, such as driving a car for the first time, attending school, or other milestones. These events may be added as transactions associated with the NFT of the child and a history of transactions may be stored digitally.

Child NFTs may be associated with third parties in exchange for information or other assets associated with parent NFTs. Each of these child NFTs can comprise a smart contract that defines a sub-policy for a respective individual's access or use of resources. The chain can include a plurality of chain branches, each of which may be associated with a given child NFT. For example, a first chain branch can comprise a first set of linked blocks, each of which can record transactions or activity data for resources associated with a first child NFT. A second chain branch can comprise a second set of linked blocks, each of which can record transaction and activity data for resources associated with a second child NFT. Alternatively, child NFTs may be provided for a second group of individuals (e.g., company B). Accordingly, sub-child NFTs can be nested within the child NFT. Each sub-child NFT can be associated with a given individual of the second group. The chain can include a chain branch set for each child NFT. Each chain branch set can comprise a chain branch for recording transactions or activity relating to resources associated with each sub-child NFT.

Figure 1:
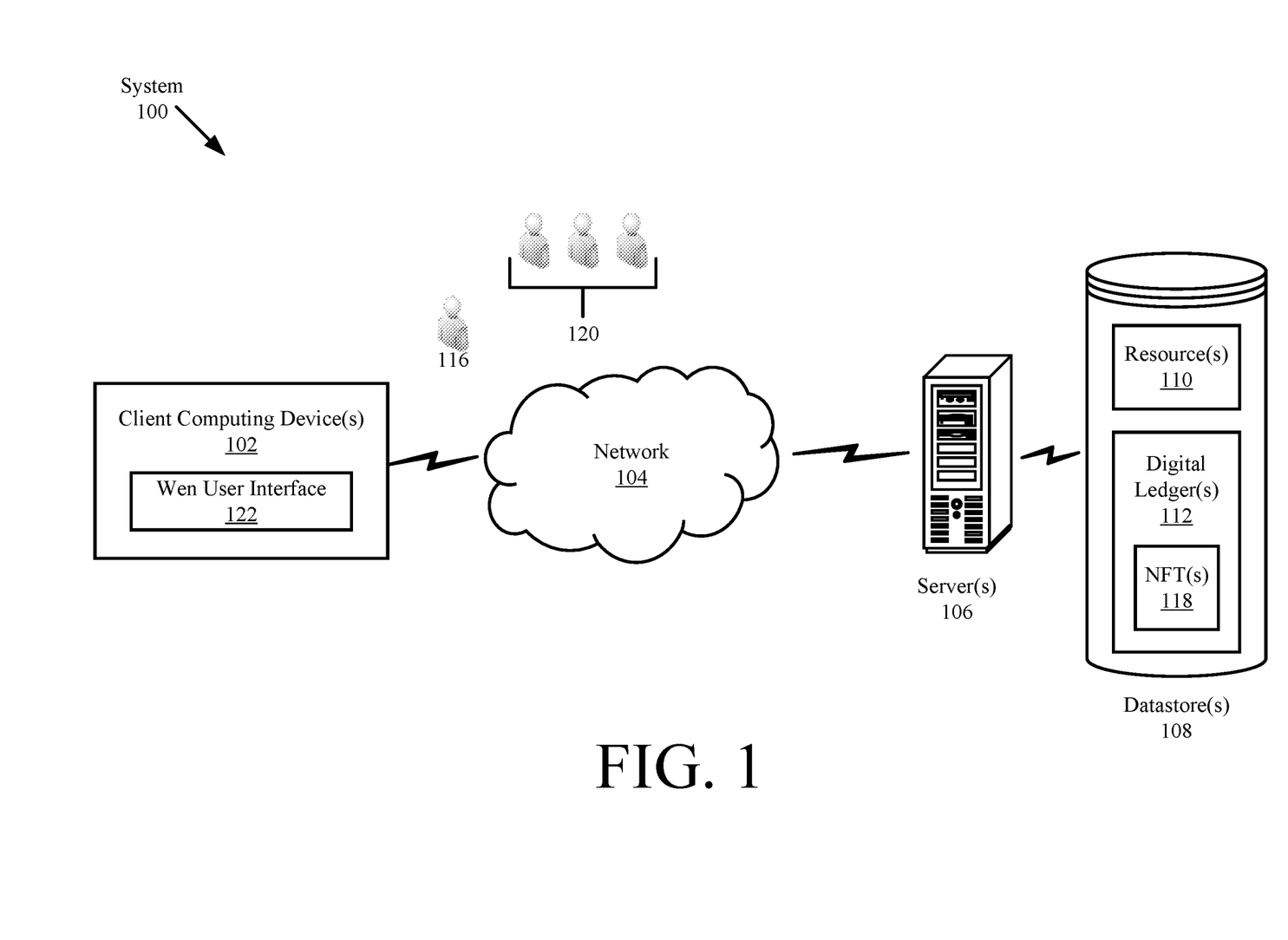
FIG. 1 is an illustration of an illustrative system.

Referring now to FIG. 1, illustrative system 100 is provided. System 100 comprises client computing devices 102, severs 106 and datastores 108. The client computing devices 102 can include, but is(are) not limited to, personal computers, desktop computers, laptop computers, smart devices, tablets or personal digital assistants. The client computing devices 102 is(are) communicatively coupled to the servers 106 via a network 104 (e.g., the Internet or Intranet). The datastores 108 can comprise a centralized storage system or a distributed storage system.

The servers 106 may be configured to facilitate creation of NFTs 118 for individuals 116 and groups of individuals 120, control access to and use of the resources 110 associated with the NFTs 118 by client computing devices 102, and facilitate transactions relating to the resources 110. The resources 110 include, but are not limited to, media resources (e.g., videos, images, graphics, icons, emojis, song recording, etc.) or textual resources (e.g., documents, electronic books, electronic text-based postings (e.g., tweet), computer code, medical records, prescriptions, etc.). Transactions or activities relating to the resources 110 are facilitated by a digital ledger 112 and the NFTs 118. The transactions can include, but are not limited to, a change of ownership of resources. The activities can include, but are not limited to, a viewing of resources or a modification to resources.

The digital ledger 112 may be implemented as a chain-based ledger, and stored in a centralized or decentralized manner. The chain-based ledger can include, but is not limited to, a private blockchain or a public blockchain. The term "blockchain", as used herein, refers to a digital ledger in which transactions made between two parties are recorded chronologically, efficiently and in a verifiable and permanent way. The digital ledger defines a cryptographically secure chain of blocks. Each record in the digital ledger comprises a block. Each block contains a cryptographic hash of the previous block, a timestamp, or transaction or activity data. In this way, the blocks cannot be altered retroactively without the alteration of all subsequent blocks and the consensus of the network. By implementing chain-based technology in a novel way, the present solution allows for a provision of a decentralized digital ledger with nested NFTs. Transactions and activities relating to resources 110 are facilitated by leveraging the decentralized digital ledger as a foundation.

Figure 2:
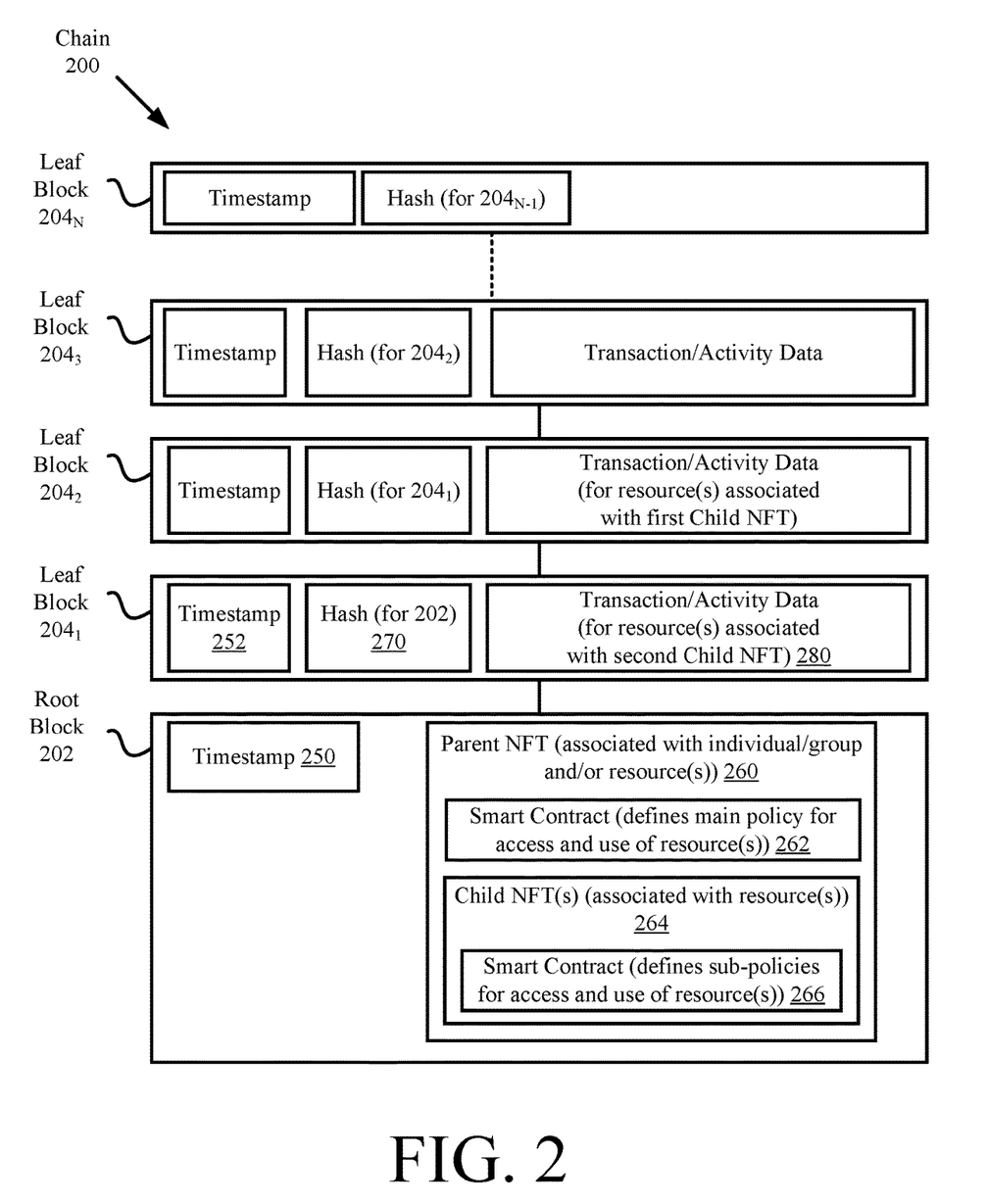
FIG. 2 illustrates a data structure comprising a parent NFT and a nested child NFT for controlling access to resources, in accordance with some examples described herein.

FIG. 2 illustrates a data structure comprising a parent NFT and a nested child NFT for controlling access to resources, in accordance with some examples described herein. For example, chain 200 provides a digital ledger in which transactions or activities are performed in relation to resources (e.g., resources 110 of FIG. 1) are recorded chronologically, efficiently and in a verifiable and permanent way. Chain 200 may comprise a private chain in which content thereof is only accessible to certain individuals (e.g., the individuals associated with a parent NFT) or a public chain in which content thereof is accessible to certain individuals (e.g., individuals associated with parent or child NFTs) or any member of the general public. This feature of the chain 200 may be customizable at the time of creating parent NFT 260 and can be changed at any time. Chain 200 may be stored in datastores (e.g., datastore 108 of FIG. 1) as a digital ledger (e.g., digital ledger 112 of FIG. 1) in a centralized or decentralized manner. The chain 200 comprises a cryptographically secure chain of blocks. The blocks include a root block 202 and a plurality of leaf blocks $204_1$, $204_2$, $204_3$, . . . , $204_N$ (collectively referred to as "204"), where N may be an integer greater than zero.

The root block 202 comprises a timestamp 250 and a parent NFT 260. The timestamp 250 may include a time of a respective transaction between a client device and a server for creating the parent NFT or root block 202. The parent NFT 260 may be associated with (i) a first individual (e.g., person 1) or a first group of individuals (e.g., members of a family) and (ii) resources. The resources can include, but is(are) not limited to, visual content (e.g., images), audio content (e.g., digital songs) or textual content (e.g., tweets, text messages, digital tickets, or electronic documents). The parent NFT 260 includes a smart contract (or code) 262 defining a main policy for access to and use of resources (e.g., resources 110 of FIG. 1) by other individuals or groups of individuals. For example, the main policy may be that given individuals (e.g., doctors or staff members of event producer) or groups of individuals (e.g., personnel of a medical practice or event venue) may access given resources (e.g., medical documents (e.g., such prescriptions, x-rays, blood test results, etc.) or digital tickets for a concert, play or other performance) associated with the individual or group of individuals for which the parent NFT was created. The present solution is not limited in this regard. The main policy can include, but is not limited to, a privacy setting for the resources.

One or more child NFTs 264 may be nested within the parent NFT 260. Each child NFT 264 may be associated with respective resources of the resources associated with the parent NFT 260. The child NFT 264 includes a smart contract (or code) 266 defining a sub-policy for access to or use of the respective resources. For example, the sub-policy may correspond with particular individuals (e.g., doctors or staff member) or groups of individuals (e.g., personnel of a medical practice or event venue). One or more of these individuals may be identified as being able to modify certain resources (e.g., a medical record or digital ticket) in defined manners (e.g., add content to the medical record but prevented from deleting existing content of the medical record, or mark digital ticket as being scanned). The present solution is not limited in this regard.

Each leaf block $204_1$, $204_2$, $204_3$, . . . , $204_N$ provides a record of a transaction or activity relating to resources associated with a given child NFT 264. In this regard, each leaf block comprises a timestamp 252, a hash 270 for the previous block and transaction or activity data 280. The timestamp 252 may include a time of the block's creation. Hash values may be generated using a hash algorithm. Algorithms for generating hashes 270 of the leaf blocks may comprise, for example, a mathematical function that generates unreadable data that are not easily decoded by other systems. The algorithm may comprise a cryptographic hash function that is deterministic (e.g., SHA-1, etc.) to compress the data block and encode it.

The transaction or activity data 280 may include, but is not limited to, resource identifiers, user identifiers, user permissions, user authorization durations (e.g., six hours), instructions how to access or use resources, or specifics of transactions made by an individuals associated with given resources (e.g., a drink/food/item purchase made while a person was attending a concert or other performance).

The last leaf block $204_N$ in the chain 200 only includes a timestamp and a hash of the previous block (e.g., block $204_{N-1}$). It does not originally include transaction or activity data. Transaction or activity data may be added to the block $204_N$ by a server when a new transaction is performed between a client device and the server or a new activity is performed via the client device in relation to resources. The new transaction or activity can include: (1) giving new permissions to a user for accessing one or more resources for a defined period of time; revoking permissions from the user for accessing one or more resources; accessing resources by a client device; transferring ownership of resources from a first owner to a second owner; modifying contents of resources; printing resources; or downloading resources. When this modification to transaction block $204_N$ occurs, a new transaction block $204_{N+1}$ (not shown in FIG. 2) may be created which includes the hash of transaction block $204_N$.

During a transaction or activity process, a client device (e.g., client device 102 of FIG. 1) can execute a Web User Interface (WUI) (e.g., WUI 122 of FIG. 1) (e.g., a web browser). The client device can then communicate a request for a list of references that its user is permitted to access as specified by the main policy of the parent NFT 260. A server (e.g., server 106 of FIG. 1) generates the requested list and communicates the same to the client device. Thereafter, the client device can send a request message for instructions on launching or otherwise accessing a particular resource identified in the list to the server. The server can provide the requested instructions to the client device along with an authorization value (e.g., child NFT 264). Upon receipt of the instructions, the client device can send a request message to the server for launching or accessing the resource. This request message may be sent along with the authorization value (e.g., child NFT 264). The server can perform operations to determine if the authorization value is valid. If so, the client device may be allowed access to or use of the resources in the manner defined by the a sub-policy defined in the smart contract of the child NFT.

Figure 3:
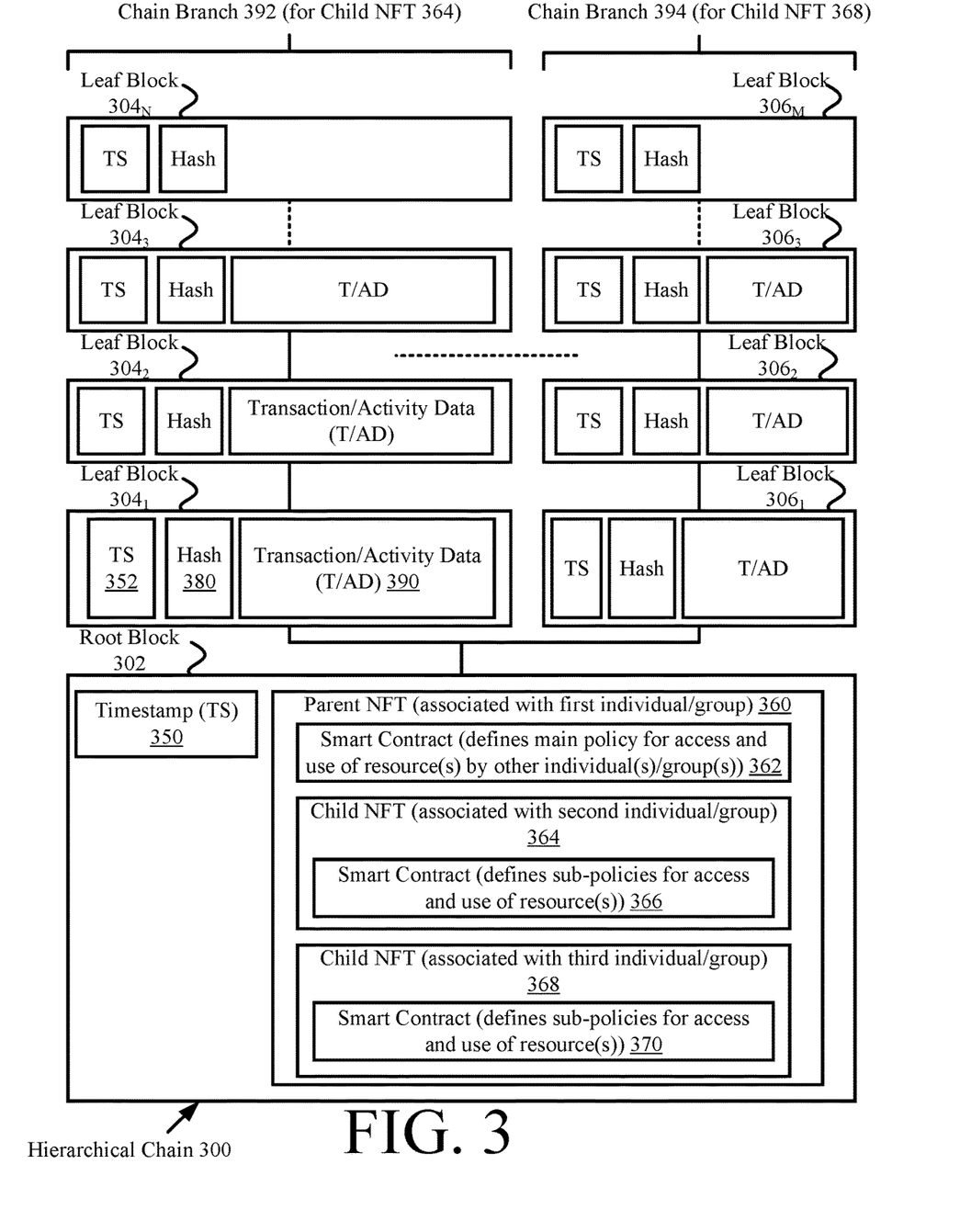
FIG. 3 illustrates a data structure comprising a parent NFT and two nested child NFTs for controlling access to resources, in accordance with some examples described herein.

FIG. 3 illustrates a data structure comprising a parent NFT and two nested child NFTs for controlling access to resources, in accordance with some examples described herein. In FIG. 3, an illustration of another chain 300 is provided. Chain 300 provides a digital ledger in which transactions or activities relating to resources (e.g., resource 110 of FIG. 1) are recorded chronologically, efficiently and in a verifiable and permanent way. Chain 300 may comprise a private chain in which content thereof is only accessible to certain individuals (e.g., the individuals associated with a parent NFT) or a public chain in which content thereof is accessible to certain individuals (e.g., individuals associated with parent or child NFTs) or any member of the general public. This feature of the chain 300 may be customizable at the time of creating parent NFT 260 and can be changed at any time. The chain 300 may be stored in datastores (e.g., datastore 108 of FIG. 1) as a digital ledger (e.g., digital ledger 112 of FIG. 1) in a centralized or decentralized manner.

The chain 300 can comprise a cryptographically secure hierarchical chain of blocks. The blocks include a root block 302 and chain branches 392, 394 with leaf blocks $304_1$, $304_2$, $304_3$, ..., $304_N$ (collectively referred to as "304"), $306_1$, $306_2$, $306_3$, ..., $306_M$ (collectively referred to as "306"). N and M may be integers greater than zero. N and M can be the same as each other or different than each other.

The root block 302 may comprise a timestamp 350 and a parent NFT 360. The timestamp 350 may include a time of a respective transaction between a client device and a server for creating the parent NFT 360 or root block 302. The parent NFT 360 can be associated with (i) a first individual (e.g., famous performer) or a first group of individuals and (ii) resources. The resources can include, but are not limited to, visual content (e.g., images), audio content (e.g., digital songs), or textual content (e.g., tweets, text messages, or electronic documents). The parent NFT 360 can include a smart contract (or code) 362 defining a main policy for access to and use of resources (e.g., resources 110 of FIG. 1) by other individuals (e.g., members of the general public, production company or venue management) or groups of individuals (e.g., car company A and car company B). For example, the main policy may be that given individuals (e.g., members of a production company) or groups of individuals (e.g., employees of car companies A or B) may access or use given resources (e.g., trademarks, brand artwork or other marketing materials) associated with the individual (e.g., famous performer) or group of individuals for which the parent NFT was created. The present solution is not limited in this regard. The main policy can include, but is not limited to, a privacy setting for the resources.

One or more child NFTs 364, 368 may be nested within the parent NFT 360. Each child NFT 364, 368 can be associated with (i) respective individuals (e.g., member of production company) or groups of individuals (e.g., car company A or B) and (ii) respective resources (e.g., brand artwork BA) of the resources associated with the parent NFT 360. For example, a child NFT 364 may be associated with a second individual/group of individuals, while child NFT 368 may be associated with a third individual or group of individuals. Any of the resources can be associated with the child NFTs 364, 368. Each child NFT 364, 368 can include a smart contract (or code) 366, 370 defining sub-policies for access to or use of the respective resources. For example, the sub-policy may be that the individual or group of individuals (e.g., car company A or B) may only use the resources in a particular manner (e.g., brand artwork BA can only be presented in accordance with certain rules, including presenting only in blue when displayed on a car and red when printed on a piece of clothing). The present solution is not limited in this regard.

A chain branch may be provided for each child NFT. Each chain branch may comprise a plurality of linked leaf blocks. For example, a chain branch 392 may be provided for child NFT 364, while chain branch 394 may be provided for child NFT 368. Chain branch 392 comprises leaf block 304 for recording transactions/activities associated with the second individual/group, and chain branch 394 comprises leaf blocks 306 for recording transactions or activities associated with the third individual/group. Both chain branches 392, 394 may be linked to the root block 302.

Each leaf block $304_1$, $304_2$, $304_3$, ..., $304_N$, $306_1$, $306_2$, $306_3$, ..., $306_M$ can provide a record of a transaction or activity relating to resources associated with child NFT 364, 368. In this regard, each leaf block may comprise a timestamp 352, a hash 380 for the previous block, and transaction or activity data 390. The timestamp 352 may include a time of the leaf block's creation. Hash values are well known in the art. Algorithms for generating hash values are also well known in the art. Any known or to be known hash algorithm can be used herein without limitation to generate hashes 380 of the leaf blocks. The transaction or activity data 390 may include, but is not limited to, resource identifiers, user identifiers, user permissions, user authorization durations (e.g., six hours), instructions how to access resources, or specifics of activities performed by an individual/group in relation to a given resources (e.g., car company A accessed and printed decals of brand artwork to be placed on its vehicles).

The last leaf block $304_N$, $306_M$ in each chain branch can include a timestamp and a hash of the previous block (e.g., block $304_{N-1}$, $304_{M-1}$). Transaction or activity data may be added to the leaf block $304_N$, $306_M$ by a server when a new transaction is performed between a client device and the server or a new activity is performed via the client device in relation to resources. The new transaction or activity can include: (1) giving new permissions to a user for accessing one or more resources for a defined period of time; revoking permissions from the user for accessing one or more resources; accessing a resources by a client device; transferring ownership of resources from a first owner to a second owner; modifying contents of resources; printing resources or downloading resources. When this modification to transaction block $304_N$, $306_M$ occurs, a new transaction block $304_{N+1}$, $306_{M+1}$ (not shown in FIG. 3) may be created which includes the hash of transaction block $304_N$, $306_M$.

During a transaction or activity process, a client device (e.g., client device 102 of FIG. 1) can execute a WUI (e.g., WUI 122 of FIG. 1) (e.g., a web browser). The client device can communicate a request for a list of references that its user is permitted to access as specified by the main policy of the parent NFT 360. A server (e.g., server 106 of FIG. 1) can generate the requested list and communicate the same to the client device. Thereafter, the client device can send a request message for instructions how to launch or otherwise access a particular one of the resources identified in the list to the server. The server can provide the requested instructions to the client device along with an authorization value (e.g., child NFT 364 or 368). Upon receipt of the instructions, the client device can send a request message to the server for launching or accessing the resource. This request message can be sent along with the authorization value (e.g., child NFT 364 or 368). The server can perform operations to determine if the authorization value is valid. If so, the client device may be allowed access to or use of the resources in the manner defined by the a sub-policy defined in the smart contract of the child NFT.

Figure 4:
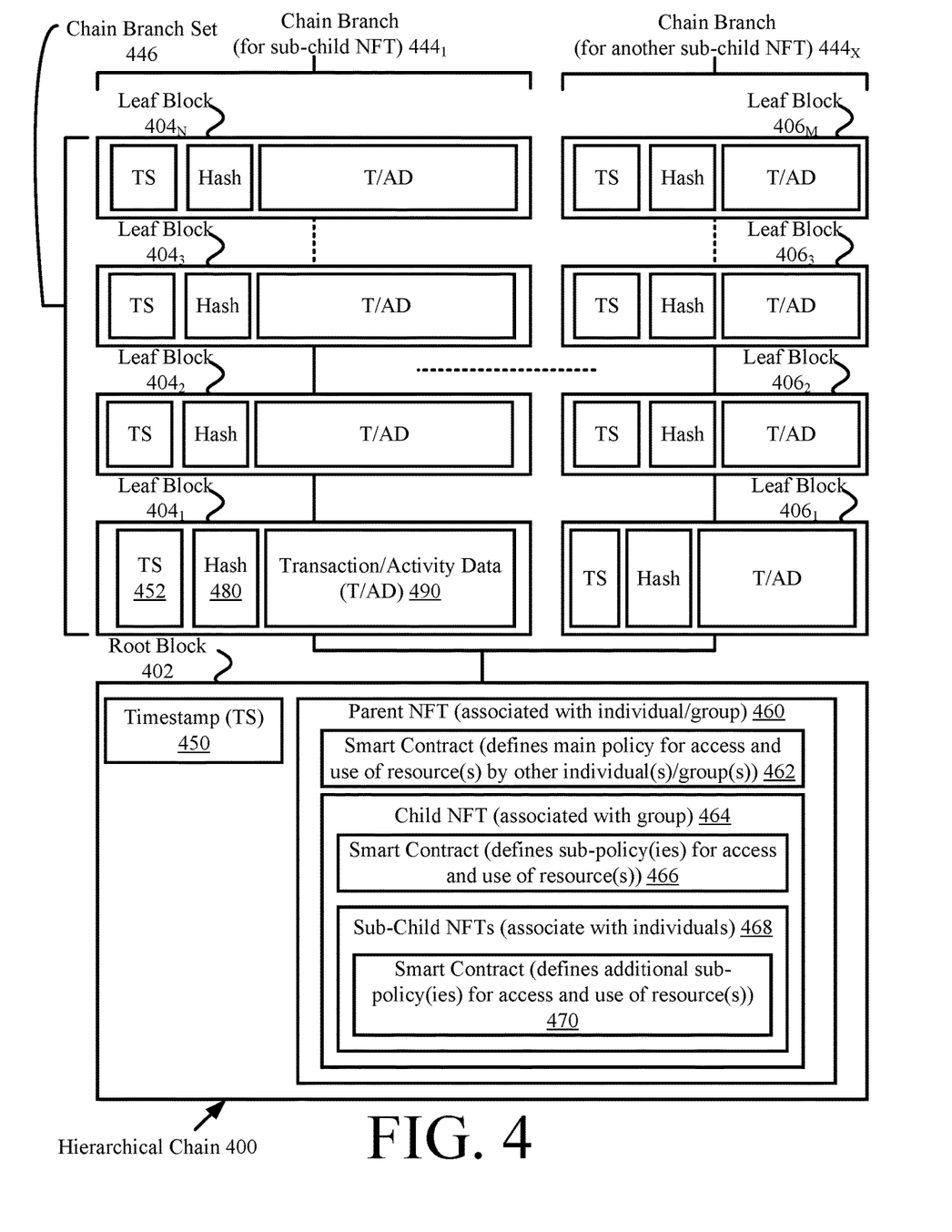
FIG. 4 illustrates a data structure comprising a parent NFT and a nested child NFT for controlling access to resources, in accordance with some examples described herein.

FIG. 4 illustrates a data structure comprising a parent NFT and a nested child NFT for controlling access to resources, in accordance with some examples described herein. In FIG. 4, chain 400 can provide a digital ledger in which transactions or activities relating to resources (e.g., resource 110 of FIG. 1) are recorded chronologically, efficiently and in a verifiable and permanent way. Chain 400 may comprise a private chain in which content thereof is only accessible to certain individuals (e.g., the individuals associated with a parent NFT) or a public chain in which content thereof may be accessible to certain individuals (e.g., individuals associated with parent, child or sub-child NFTs) or any member of the general public. This feature of the chain 400 may be customizable at the time of creating parent NFT 260 and can be changed at any time. The chain 400 may be stored in one or more datastores (e.g., datastore 108 of FIG. 1) as a digital ledger (e.g., digital ledger 112 of FIG. 1) in a centralized or decentralized manner.

The chain 400 can comprise a cryptographically secure set of chain branches $344_1, \ldots, 344_X$. Each chain branch includes a plurality of blocks arranged in a hierarchical manner. The blocks can include a root block 402 and leaf blocks $404_1, 404_2, 404_3, \ldots, 404_N$ (collectively referred to as "404"), $406_1, 406_2, 406_3, \ldots, 406_M$ (collectively referred to as "406"). N and M may be integers greater than zero. The root block 402 can comprise a timestamp 450 and a parent NFT 460. The timestamp 450 may include a time of a respective transaction between a client device and a server for creating the parent NFT 460 or root block 402. The parent NFT 460 can be associated with (i) a first individual (e.g., famous performer) or a first group of individuals and (ii) resources. The resources can include, but are not limited to, visual content (e.g., images), audio content (e.g., digital songs) or textual content (e.g., tweets, text messages, or electronic documents). The parent NFT 460 can include a smart contract (or code) 462 defining a main policy for access to and use of resources (e.g., resources 110 of FIG. 1) by other individuals (e.g., members of the general public, production company or venue management) or groups of individuals (e.g., car company A and car company B). For example, the main policy may be that given individuals (e.g., members of a production company) or groups of individuals (e.g., employees of car companies A or B) may access or use given resources (e.g., trademarks, brand artwork or other marketing materials) associated with the individual (e.g., famous performer) or group of individuals for which the parent NFT was created. The main policy can include, but is not limited to, a privacy setting for the resources.

At least one child NFT 464 can be nested within the parent NFT 460. The child NFT 464 may be associated with a group of individuals (e.g., a car company) and (ii) respective resources (e.g., pieces of brand artwork) of the resources associated with the parent NFT 460. The child NFT 464 can include a smart contract (or code) 466 defining sub-policies for access to or use of the respective resources. For example, the sub-policy may be that the group of individuals (e.g., the car company) may only use the resources in particular manner (e.g., first pieces of brand artwork can only be presented in accordance with certain rules (e.g., only in blue when displayed on a car and red when printed on a piece of clothing) and second pieces of brand article can be printed in a particular orientation (e.g., in a landscape orientation and at a 5×7 size).

Sub-child NFTs 468 can be nested within the child NFT 464. Each sub-child NFT may be associated with a given employee or member of the group (e.g., car company) associated with the child NFT 464. The sub-child NFT 468 can include a smart contract (or code) 470 defining additional sub-policies for access to or use of the respective resources. For example, the additional sub-policy may be that the given employee or member of the group (e.g., the car company) may access the resources for viewing but is not permitted to modify the resources or print the resources without payment or authorization by a manager. A chain branch set 446 can be provided for each child NFT 464. The chain branch set 446 can include a plurality of chain branches $444_1, \ldots, 444_1$, where each chain branch may be provided for a respective sub-child NFT 468. X may be an integer. For example, a chain branch $444_1$ may be provided for a first sub-child NFT, while chain branch $444_X$ may be provided for a second different sub-child NFT. Each chain branch can comprise a plurality of linked leaf blocks. In this regard, chain branch $444_1$ can comprise leaf block 404 for recording transactions/activities associated with a first individual, and chain branch $444_X$ can comprise leaf blocks 406 for recording transactions/activities associated with the second different individual. Both chain branches $444_1, 444_1$ can be linked to the root block 402.

Each leaf block $304_1, 304_2, 304_3, \ldots, 304_N, 306_1, 306_2, 306_3, \ldots, 306_M$ can provide a record of a transaction or activity relating to resources associated with a given sub-child NFT 468. Each leaf block can comprise a timestamp 452, a hash 480 for the previous block, and transaction or activity data 490. The timestamp 452 may include a time of the leaf block's creation. Hash values may be generated using a hash algorithm. Algorithms for generating hashes 480 of the leaf blocks may comprise, for example, a mathematical function that generates unreadable data that are not easily decoded by other systems. The algorithm may comprise a cryptographic hash function that is deterministic (e.g., SHA-1, etc.) to compress the data block and encode it.

The transaction or activity data 490 may include, but is not limited to, resource identifiers, user identifiers, user permissions, user authorization durations (e.g., six hours), instructions how to access resources, or specifics of activities performed by an individual in relation to a given resource (e.g., a person accessed and printed decals of brand artwork to be placed on its vehicles).

The last leaf block $404_N$, $406_M$ in each chain branch can include a timestamp and a hash of the previous block (e.g., block $404_{N-1}$, $404_{M-1}$). Transaction or activity data may be added to the leaf block $404_N$, $406_M$ by a server when a new transaction is performed between a client device and the server or a new activity is performed via the client device in relation to resources. The new transaction or activity can include: (1) giving new permissions to a user for accessing one or more resources for a defined period of time; revoking permissions from the user for accessing one or more resources; accessing a resource by a client device; transferring ownership of resources from a first owner to a second owner; modifying contents of resources; printing resources or downloading resources. When this modification to transaction block $404_N$, $406_M$ occurs, a new transaction block $404_{N+1}$, $406_{M+1}$ (not shown in FIG. 4) can be created which includes the hash of transaction block $404_N$, $406_M$.

During a transaction or activity process, a client device (e.g., client device 102 of FIG. 1) can execute a WUI (e.g., WUI 122 of FIG. 1) (e.g., a web browser). The client device can communicate a request for a list of references that its user is permitted to access as specified by the main policy of the parent NFT 460. A server (e.g., server 106 of FIG. 1) can generate the requested list and communicate the same to the client device. Thereafter, the client device can send a request message for instructions how to launch or otherwise access a particular resource identified in the list to the server. The server can provide the requested instructions to the client device along with an authorization value (e.g., child NFT 464 or sub-child NFT 468). Upon receipt of the instructions, the client device can send a request message to the server for launching or accessing the resource. This request message can be sent along with the authorization value (e.g., child NFT 464 or sub-child NFT 468). The server can then perform operations to determine if the authorization value is valid. If so, the client device is allowed access to or use of the resources in the manner defined by the sub-policies specified in the smart contract of the child NFT or sub-child.

Figure 5:
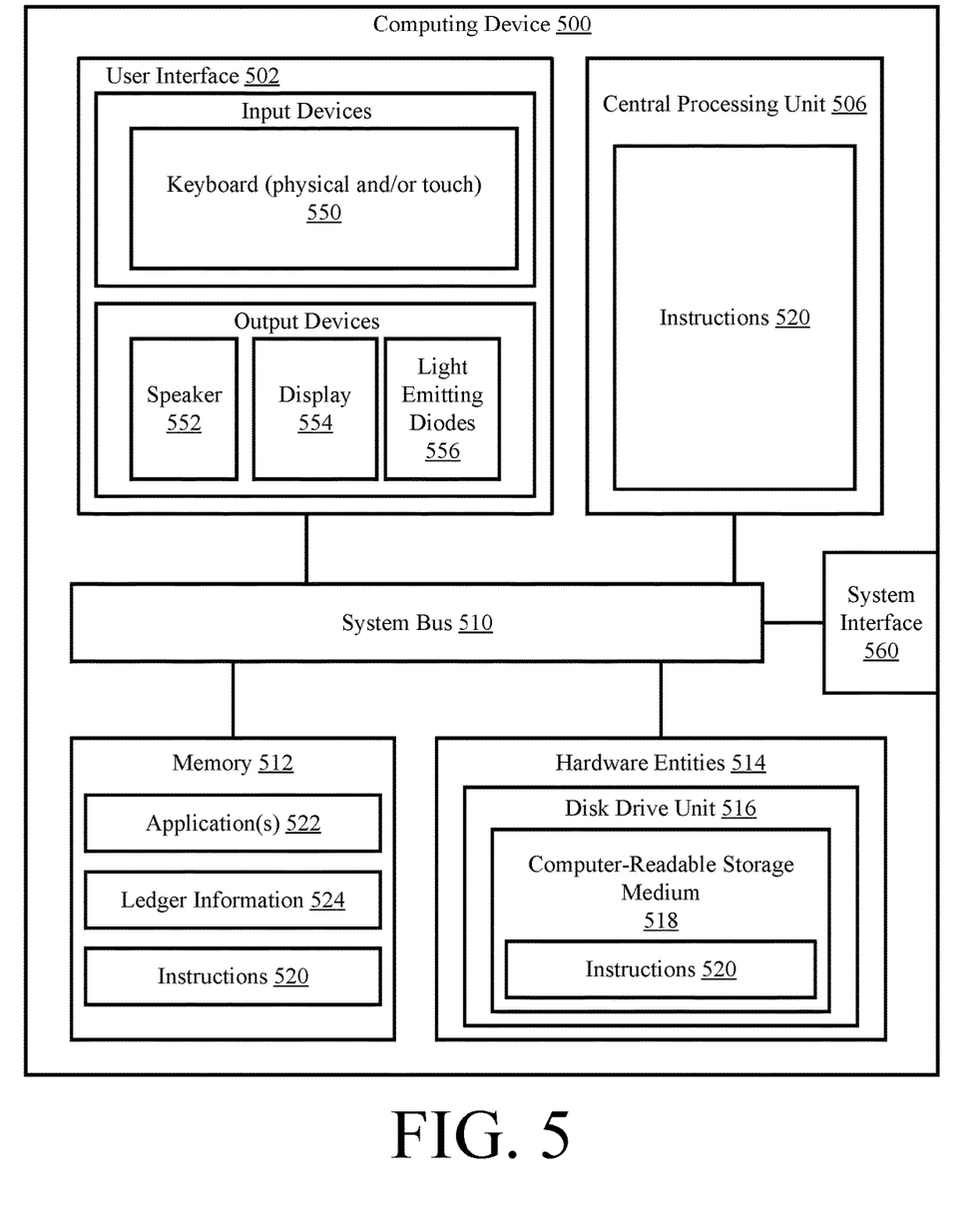
FIG. 5 provides an illustration of a computing device.

Referring now to FIG. 5, there is provided an illustration of an architecture for a computing device 500. Examples implementing this computing device can include client computing device 102 and server 106. Some or all components of the computing device 500 can be implemented as hardware, software or a combination of hardware and software. The hardware includes, but is not limited to, one or more electronic circuits. The electronic circuits can include, but are not limited to, passive components (e.g., resistors and capacitors) or active components (e.g., amplifiers or microprocessors). The passive or active components can be adapted to, arranged to or programmed to perform one or more of the methodologies, procedures, or functions described herein.

As shown in FIG. 5, the computing device 500 comprises a user interface 502, a Central Processing Unit (CPU) 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices can include a physical or touch keyboard 550. The input devices can be connected to the computing device 500 via a wired or wireless connection (e.g., a Bluetooth® connection). The output devices can include a speaker 552, a display 554, or light emitting diodes 556. System interface 560 can be configured to facilitate wired or wireless communications to and from external devices (e.g., network nodes such as access points, etc.).

At least some of the hardware entities 514 perform actions involving access to and use of memory 512, which can be a Random Access Memory (RAM), a solid-state or disk driver or a Compact Disc Read Only Memory (CD-ROM). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 420 can also reside, completely or at least partially, within the memory 512 or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

Computing device 500 can implement chain-based technology. In this regard, computing device 500 can run one or more software applications 522 for facilitating the creation of NFTs and chains (e.g., chain 200 of FIG. 2, chain 300 of FIG. 3, and chain 400 of FIG. 4), the storage of chain information (e.g., digital ledger 112 of FIG. 1, chain 200 of FIG. 2, chain 300 of FIG. 3, and chain 400 of FIG. 4, or block identifiers) in a local memory 512 or a remote datastore 108 of FIG. 1, or controlled access to resources in accordance with a chain based technique as described herein. Other operations or functions of software applications 522 are evident from other portions of this document.

Figure 6:
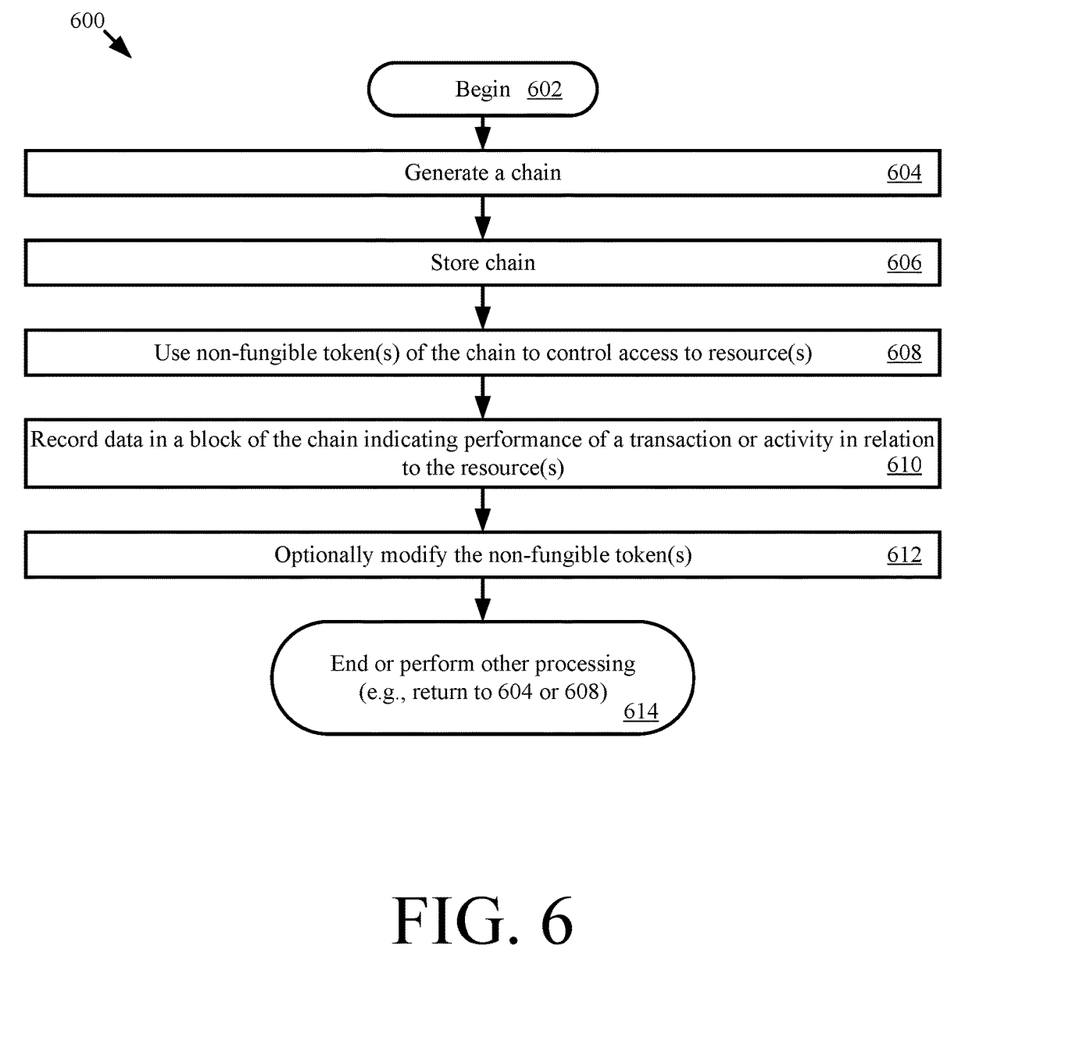
FIG. 6 provides a flow diagram of an illustrative method for controlling access to resources using a chain-based system.

Referring now to FIG. 6, a method 600 for controlling access to resources (e.g., resources 110 of FIG. 1) can comprise block 602 and continue with block 604 where a computing device (e.g. server 106 of FIG. 1 or computing device 500 of FIG. 5) performs operations to generate a chain (e.g., chain 200 of FIG. 2, 300 of FIG. 3 or 400 of FIG. 4). As described above, the chain can comprise a plurality of blocks (e.g., blocks 202, $204_1$, ..., $204_N$ of FIG. 2, blocks 302, $304_1$, ..., $304_N$, $306_1$, ..., $306_M$ of FIG. 3, or blocks 402, $404_1$, ..., $404_N$, $406_1$, ..., $406_M$ of FIG. 4) linked to each other. At least a first block (e.g., block 202 of FIG. 2, 302 of FIG. 3 or 402 of FIG. 4) can comprise a parent NFT (e.g., parent NFT 260 of FIG. 2, 360 of FIG. 3 or 460 of FIG. 4) with at least one child NFT (e.g., child NFT 264 of FIG. 2, 364 of FIG. 3, 368 of FIG. 3 or 464 of FIG. 4) nested therein. The parent NFT can comprise a first smart contract (e.g., smart contract 262 of FIG. 2, 362 of FIG. 3, or 462 of FIG. 4) defining a main policy for accessing or using the resources. The main policy may define a privacy setting for the resources. The child NFT can comprise a second smart contract (e.g., smart contract 266 of FIG. 2, 366 of FIG. 3, 370 of FIG. 3, or 466 of FIG. 4) defining sub-policies for accessing or using the resources. The chain may be stored in 606, for example, in datastores (e.g., datastore 108 of FIG. 1). The datastore can comprise a distributed storage system.

At block 610, the computing device can perform operations to record data in a second block (e.g., block $204_N$ of FIG. 2, $304_N$ of FIG. 3, $306_M$ of FIG. 3, $404_N$ of FIG. 4 or $406_M$ of FIG. 4) indicating performance of a transaction or activity in relation to the resources. The parent NFT or child NFTs may be modified at block 612. This modification can involve: changing a policy; adding a new policy for the resources; or adding a new resource and policies therefore. Subsequently, at block 614, the method can return to blocks 604 or 608 as needed.

Figure 7:
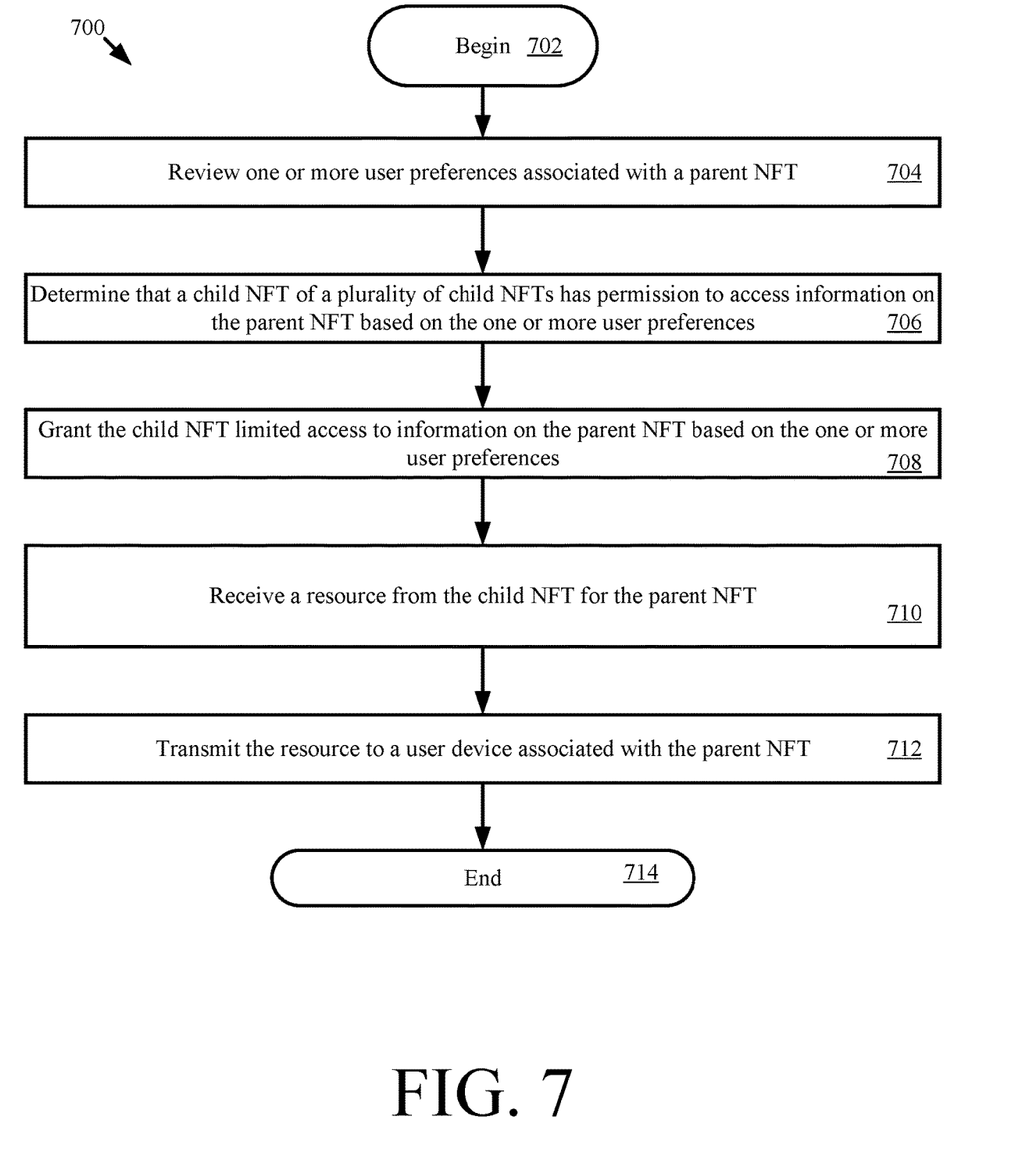
FIG. 7 provides a flow diagram of an illustrative method for maintaining NFT relationships.

Referring now to FIG. 7, a method 700 for maintaining NFT relationships can comprise block 702 and continue with block 704 where the system can review one or more user preferences associated with a parent NFT. As described above, preferences can include privacy considerations, preferred advertisements, tokens to allow third party access to the NFT data, or other representations of the user's identity.

At block 706, the system can determine that a child NFT of a plurality of child NFTs has permission to access information on the parent NFT based on the one or more user preferences. As described above, the server can perform operations to determine if an authorization value is valid. If so, the child NFT can be allowed access to or use of the resources in the manner defined by the sub-policies specified in the smart contract of the parent NFT.

At block 708, the system can grant the child NFT limited access to information on the parent NFT based on the one or more user preferences. Limited access may comprise information specific to the third party associated with the child NFT or information based on the industry associated with the third party, such as retail categories or preferences.

At block 710, the system can receive a resource from the child NFT for the parent NFT. The resource may comprise a reward, coupon, or offer specific to the third party associated with the child NFT. For example, the resource may be limited time coupon for a store in the vicinity of the user device associated with the parent NFT. At block 712, the system can transmit the resource to a user device associated with the parent NFT. The resource may be stored on the user device. The user device may receive instructions on how to access the resource, such as through a QR code or barcode. The user device may retrieve the resource as needed to use the resource.

Further detail as to the systems and methods described herein may be found in PCT Application No. PCT/US22/31600, the contents of which are incorporated herein in its entirety.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

What is claimed is:

1. A method for maintaining non-fungible token (NFT) relationships, comprising:
   receiving a cryptographically secure set of chain branches of a blockchain, wherein the set of chain branches comprises a root block and a set of linked leaf blocks, wherein the root block comprises a timestamp and a parent NFT, and a child NFT is nested within the parent NFT,
   wherein the parent NFT comprises a smart contract incorporating one or more user preferences, wherein the child NFT comprises the smart contract defining one or more sub-policies for access by a third party, wherein each chain branch in the set of chain branches records transactions and actions relating to the child NFT and the one or more user preferences associated with parent NFT of the root block, forming a hierarchical data structure between the parent NFT and the child NFT;

determining, using the smart contract, that the child NFT has permission to access information on the parent NFT based on the one or more user preferences and the one or more sub-policies, wherein the child NFT is associated with the third party, wherein the information accessed is a hierarchy of actions in the hierarchical data structure that are executed, stopped, or started in response to a preceding action in the hierarchical data structure between the parent NFT and the child NFT;

based on the hierarchical data structure between the parent NFT and the child NFT that defines the one or more user preferences for accessing data at each chain branch in the set of chain branches, and the determined permission granting access by the parent NFT to the information, granting, using the smart contract, the child NFT limited access to the information on the parent NFT and revoking access to other information in the hierarchical data structure;

executing, using the smart contract, the preceding action in the hierarchical data structure;

automatically executing, using the smart contract, the hierarchy of actions in response to the executed preceding action for the accessed information;

receiving, using the smart contract, an electronic resource from the child NFT for the parent NFT, wherein the electronic resource is based on the executed hierarchy of actions and the one or more user preferences;

transmitting, using the smart contract, the electronic resource to a user device associated with the parent NFT;

storing the electronic resource on the user device; and modifying, using the smart contract, at least one of the one or more user preferences of the parent NFT or the one or more sub-policies of the child NFT.

2. The method of claim 1, wherein the one or more user preferences comprise privacy settings.

3. The method of claim 1, wherein the child NFT comprises one or more sub-child NFTs, wherein each sub-child NFT is associated with an individual associated with the third party.

4. The method of claim 1, further comprising providing instructions on the user device for accessing the electronic resource.

5. The method of claim 1, wherein the parent NFT is in a block of a plurality of blocks linked to each other as a chain, wherein the child NFT is nested therein.

6. The method of claim 5, wherein the chain comprises a set of chain branches, each being associated with a sub-child non-fungible token associated with the child NFT.

7. A system comprising:
a processor;
a non-transitory computer-readable storage medium comprising instructions that when executed by the processor, cause the processor to:
receive a cryptographically secure set of chain branches of a blockchain, wherein the set of chain branches comprises a root block and a set of linked leaf blocks, wherein the root block comprises a timestamp and a parent NFT, and a child NFT is nested within the parent NFT, wherein the parent NFT comprises a smart contract incorporating one or more user preferences, wherein the child NFT comprises the smart contract defining one or more sub-policies for access by a third party, wherein each chain branch in the set of chain branches records transactions and actions relating to the child NFT and the one or more user preferences associated with parent NFT of the root block, forming a hierarchical data structure between the parent NFT and the child NFT;

determine, using the smart contract, that the child NFT has permission to access information on the parent NFT based on the one or more user preferences and the one or more sub-policies, wherein the child NFT is associated with the third party, wherein the information accessed is a hierarchy of actions in the hierarchical data structure that are executed, stopped, or started in response to a preceding action in the hierarchical data structure between the parent NFT and the child NFT;

based on the hierarchical data structure between the parent NFT and the child NFT that defines the one or more user preferences for accessing data at each chain branch in the set of chain branches, and the determined permission granting access by the parent NFT to the information, grant, using the smart contract, the child NFT limited access to the information on the parent NFT and revoking access to other information in the hierarchical data structure;

execute, using the smart contract, the preceding action in the hierarchical data structure;

automatically execute, using the smart contract, the hierarchy of actions in response to the executed preceding action for the accessed information;

receive, using the smart contract, an electronic resource from the child NFT for the parent NFT, wherein the electronic resource is based on the executed hierarchy of actions and the one or more user preferences;

transmit, using the smart contract, the electronic resource to a user device associated with the parent NFT;

store the electronic resource on the user device; and modify, using the smart contract, at least one of the one or more user preferences of the parent NFT or the one or more sub-policies of the child NFT.

8. The system of claim 7, wherein the one or more user preferences comprise privacy settings.

9. The system of claim 7, wherein the child NFT comprises one or more sub-child NFTs, wherein each sub-child NFT is associated with an individual associated with the third party.

10. The system of claim 7, wherein the instructions further cause the processor to provide instructions on the user device for accessing the electronic resource.

11. The system of claim 7, wherein the parent NFT is in a block of a plurality of blocks linked to each other as a chain, wherein the child NFT is nested therein.

12. The system of claim 11, wherein the chain comprises a set of chain branches, each being associated with a sub-child non-fungible token associated with the child NFT.

* * * * *